Nov. 12, 1968    R. L. WILSON    3,410,017
FISHING ROD GRIP

Filed June 2, 1966    2 Sheets-Sheet 1

INVENTOR
ROBERT L. WILSON
BY Petherbridge, O'Neill & Aubel
ATTORNEYS

Nov. 12, 1968   R. L. WILSON   3,410,017
FISHING ROD GRIP

Filed June 2, 1966   2 Sheets-Sheet 2

INVENTOR
ROBERT L. WILSON

BY *Pethebridge, O'Neill & Aubel*
ATTORNEYS

United States Patent Office 3,410,017
Patented Nov. 12, 1968

3,410,017
FISHING ROD GRIP
Robert L. Wilson, 10047 Avenue N,
Chicago, Ill. 60617
Continuation-in-part of application Ser. No. 496,515,
Oct. 15, 1965. This application June 2, 1966, Ser.
No. 563,621
12 Claims. (Cl. 43—22)

ABSTRACT OF THE DISCLOSURE

A removable tubular friction rod grip which may be in one or two parts and which is adapted to cover the reel seat area of the rod and reel mounting portions carried by the rod. The said grip also covers the reel base and has an opening therein to accommodate the reel stem. The said grip is particularly adapted for rods provided with spinning reels.

---

This invention relates to a hand grip for a fishing rod and reel combination and more particularly to a detachable grip for fishing rods, and this application is a continuation-in-part of my earlier application Ser. No. 496,515, filed Oct. 15, 1965 for Fishing Rod Grip, now abandoned.

It has been found that while the presently available fishing rods and reels and, particularly, spinning rods and reels are mechanically efficient and are effective instruments in the hands of fishermen, they are not particularly comfortable during periods of extended use. Since most fishermen spend many hours with such rods and reels in their hands while enjoying this recreational pastime, comfort and ease in handling of rods and reels becomes important. This has been found to be particularly true with respect to spinning rods and reels where the reel depends from the underside of the rod and the normal gripping portion of the rod is in the area of reel mounting.

The common spinning rod employs a reel seat which, when placed in its normal casting or retrieving position, faces downwardly. A spinning reel is generally secured in this seat between a pair of ring-like appurtenances into which the reel mounting base is inserted. Ordinarily, one of the rings is moved towards the other fixed ring by means of a manually adjustable locking nut connected to it. The ring adjustment acts to rigidly secure the reel mounting base between the rings and thereby to the rod seat. The resulting assembly, however, includes the projections of the opposed mounting rings, the reel mounting base, the locking nut, and the threaded portion over which the locking nut travels. This assemblage lies along that portion of the rod which is normally gripped by the hand during the use of the rod. It can, therefore, be seen that the surface discontinuities produced by these appurtenances can result in a considerable degree of discomfort to the user as he pursues his pastime.

The invention is directetd to a detachable hand grip sleeve which can be connected to a rod and reel combination to cover the discontinuities in the reel seat area of the rod and to provide a firm but comfortable hand gripping surface for the user. The detachable hand grip of the invention, when connectetd to a rod and reel combination, and particularly a spinning rod and reel, will provide a smooth gripping surface for the palm of the user, a portion of alternate ridges and depressions into which the fingers of the user may be comfortably cradled, and a raised thumb support portion conforming to the configuration of the ball of the thumb to enhance comfort and control of the rod.

Since many fishermen have more than a single rod and reel, it was determined that the hand grip of the invention should be made in a manner such that it could be readily attached and removed from a rod and placed on another if desired. The grip, therefore, is preferably fabricated from a moldable resilient plastic or rubber material which can be cut along its longitudinal axis to provide a means for resiliently expanding the hand grip sleeve in order that it may be slipped over the reel seat portion of a fishing rod and be moved as required.

In some instances, it has been found to be desirable to cut the resilient gripping material along its entire longitudinal axis so that the grip can be expanded and slipped over the reel seat and butt portion of the rod. In other instances, however, it has been found to be desirable to cut the resilient generally cylindrical grip at the point of projection of the reel stem from the reel seat either backward or forward. With such a grip construction, the resilient generally cylindrical grip can be telescoped over the front or back end of the butt portion of the rod. The cut portion can freely pass around the projecting reel stem until the grip has been properly positioned relative to the reel seat on the rod butt.

Under other conditions, it has been found that the grip of the invention can be formed from a pair of generally cylindrical sections. These sections can be slipped over the front and back portions of the rod butt. The ends of the sections can be joined at the point on the reel seat from which the reel stem projects. Suitable connecting means at the junction of the sections will serve to produce an essentially one-piece resilient rod grip.

While the molded hand grip sleeve can be secured to a rod over the reel connecting appurtenances thereof and the resiliency of the material employed can be used to maintain the attachment of the hand gripping sleeve to the rod, it has been found that the sleeve may be formed in two elongated axial sections which can be hinged along one pair of adjacent edges permitting the application of the sleeve over the reel seat portion of the rod. Utilizing snap-type fasteners, the hinged sections can be secured together around the rod in firm gripping relationship therewith. Snap connections can be used in both the hinged and unhinged hand grip sleeves of the invention. The snap connections are ordinarily placed in a manner such that when the open ends of the sleeve are closed and connected together, no projection or appurtenance interferes with the comfort provided by the gripping surface of the sleeve.

The inner surface of the hand grip sleeve of the invention is designed in a manner such that it will accommodate most conventional fishing rods and, particularly, spinning rods.

The inner surface is designed to span the reel mounting seat portion of the rod, to conform to the general configuration of the exterior of the rod and reel in the area of the mounting seat and to conceal this portion of the rod.

The interior portion of the hand grip sleeve which is positioned adjacent the lock nut of the rod is peripherally roughened to provide a resisting surface to resist the potential movement of the lock nut and thereby reduce the tendency of the lock nut to work loose during use of the rod and reel.

When assembled to a rod with a reel projecting from the hand grip sleeve, the lower surface of the sleeve is gripped by the fingers which are comfortably cradled in the depressions between the ridges extending generally transversely to the longitudinal axis of the rod. The upper portion of the sleeve provides an enlarged and smooth gripping surface for the palm of the hand and in some embodiments, a ridge and depression arrangement is provided which provides a convenient and comfortable thumb grip.

Various objects and advantages of the invention will hereinafter become more fully apparent from the following description of the drawings illustrating presently preferred embodiments thereof and wherein.

Figure 1:
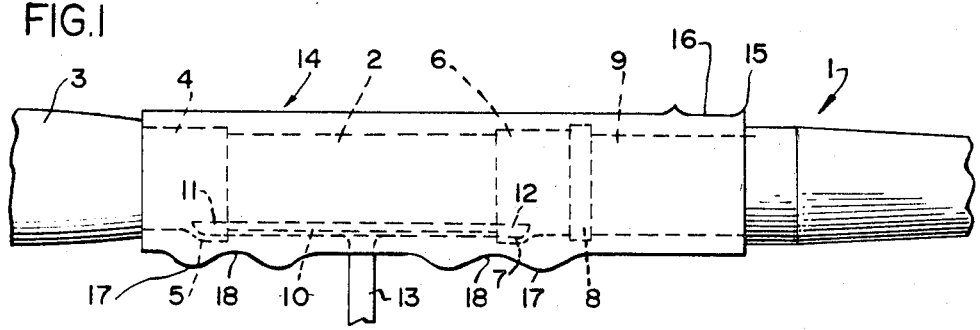
FIG. 1 is a side elevation of the hand grip sleeve of the invention secured to a fishing rod illustrating the stem portion of a reel mounting base projecting from the lower surface of the sleeve.

FIG. 1 illustrates a portion of the butt section of a spinning rod, generally indicated 1, including a reel seat 2 and a portion of the butt 3. Adjacent to the butt end of reel seat 2 is a generally cylindrical or ring-like member 4 having a downwardly projecting enlarged section 5 providing a slot into which an end of a spinning reel mounting base can be inserted. A second ring-like member 6 is shown in FIG. 1 spaced longitudinally on reel seat 2 from the member 4. Ring-like member 6 is also provided with an enlarged downwardly extending and slotted reel mounting base receiving portion 7. While member 4 of the rod is ordinarily fixed rigidly to the butt end of the rod on the reel seat thereof, the other member 6 is ordinarily movable along the axis of the rod in the area of the reel seat 2. A lock nut 8 engages member 6 and is movable on threaded portion 9 of the rod in the reel seat area. This nut is employed to move cylindrical member 6 axially forward or backward on the reel seat to engage the mounting base 10 of the spinning reel as shown in FIG. 1 between members 4 and 6. This rigidly secures the reel to the rod in the reel seat area of the rod with the opposed ends 11 and 12 of mounting base 10 enclosed by the enlarged slotted portions 5 and 7 of the members 4 and 6, respectively. The stem 13 of the spinning reel extends downwardly from the mounting base 10 to the spinning reel itself, not shown, but which can be any of the well-known reels.

The hand grip sleeve of the invention, generally designated 14, is shown in FIG. 1 in its operative position with respect to a spinning rod and reel. The hand grip sleeve, which is roughly cylindrical in appearance, is positioned in surrounding relationship with respect to the reel seat and securement portion of the rod. The internal surface of the grip 14 is made to conform generally to the configuration of the discontinuities of the reel seat and attachment appurtenances.

Figure 2:
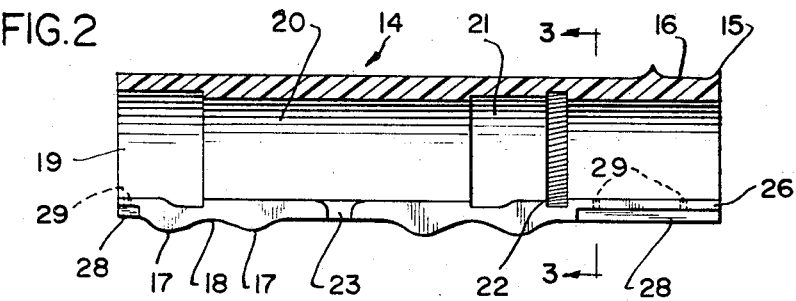
FIG. 2 is a cross-section of the hand grip sleeve shown in FIG. 1.

The upper portion of the hand grip 14, as shown in FIG. 1, is of a generally smooth character with a raised thumb rest portion 15 opposite the butt end of the rod. As is shown in FIGS. 1 and 2, the raised portion 15 is provided with a depression 16 which is designed to accommodate the thumb of a user of the rod in a manner such that maximum comfort is achieved and better directional control of the rod during casts is obtained. The underside of the grip 12 is provided with a series of alternate ridges 17 and depressions 16 which extend generally transversely to the axis of the grip and provide comfortable cradles for finger gripping the underside of the hand grip 14.

Referring to the embodiment shown in FIG. 2, which is preferably fabricated from a resilient moldable plastic or rubber material, it can be seen that the interior of the grip 14 is provided with a recess 19 which generally conforms to the configuration of ring-like member 4 and the enlargement 5 thereof. The central portion 20 of the grip conforms in general to the reel seat 2 of the rod. The interior of the grip at the end opposite the butt 3 is provided with a recess 21 which generally corresponds to the configuration of ring-like member 6 and the enlargement 7 thereof. The inner peripheral surface 22 of the grip 14 adjacent the recess 21 is roughened, as by knurling, to produce a frictional lock nut gripping surface which will act to grip the lock nut 8 of the rod firmly and to prevent the axial movement of the lock nut and resultant loosening of the spinning reel securement to the rod. The central portion 20 is provided with an opening 23 through which the stem 13 of the reel projects. With the arrangement shown in FIG. 2, two fingers of the hand can be cradled on the underside of the grip in front of the reel stem 13 projecting from opening 23 and two fingers can be cradled behind the reel stem. The thumb can be comfortably positioned in depression 16 of raised portion 15. Since grip 14 acts to increase the overall diameter of reel seat 2 of the rod, the palm of the user's hand is provided with a more substantial and comfortable gripping mass.

Figure 3:
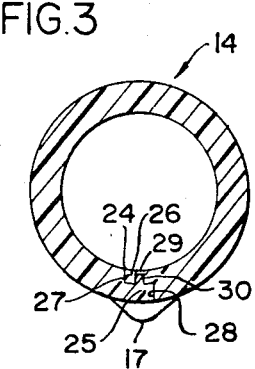
FIG. 3 is a transverse sectional view taken on lines 3—3 of the hand grip sleeve of FIG. 2.

The embodiment of the grip 14 shown in FIGS. 2 and 3 is formed with longitudinal break 24 which extends from one end of the grip to the other. This break permits the resilient opening or expansion of the grip along the edges 26 and 26 defining the longitudinally extending break in order that the hand grip may be saddled over the rod and reel combination as shown in FIG. 1. After the grip has been saddled over the reel seat, the material thereof resiliently contracts to firmly grip the rod and reel combination.

Referring particularly to FIG. 3, it can be seen that edge 25 is formed with an inwardly facing recess 27 and edge 26 is formed with an outwardly facing recess 28. Recesses 27 and 28 together with edges 25 and 26 provide complementing interengaging surfaces when break 24 of the grip is in closed position. Radial openings 29 are bored through edge 26 and establish communication between recess 28 and the interior of the grip. As shown in FIG. 3, edge 25 is provided with projections 30 which are positioned to register with radial openings 29 when longitudinal break 24 is closed and the surfaces of edges 25 and 26 are in mating relationship. When the edges are closed, projections 30 snap into the openings 29 and produce a rigid but separable connection of the edges. This locking arrangement acts to augment the resilient gripping of the material of the grip 14 to rigidly connect grip 14 to the reel seat portion of the rod. If the user should desire to change rods or to change reels, he may simply pry the edges 25 and 26 apart, thereby pulling the projections 30 from openings 29, and expand the hand grip to a degree sufficient to permit its removal from the rod.

Figure 4:
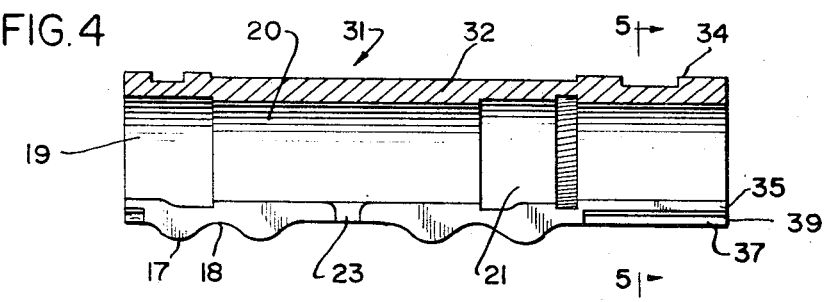
FIG. 4 is a longitudinal sectional view of a section of a hinged hand grip sleeve of the invention.
Figure 5:
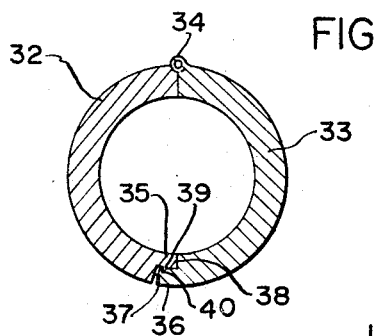
FIG. 5 is a transverse sectional view taken along line 5—5 of the embodiment shown in FIG. 4.

The embodiment shown in FIGS. 4 and 5 is basically similar to that shown in FIGS. 1, 2 and 3, and, where identical, the same reference characters are employed. The main difference between the embodiments lies in the hinged construction of the grip shown in FIGS. 4 and 5. In this instance, the hand grip sleeve 31 is formed from two longitudinal sections 32 and 33 which are connected along the longitudinal axis thereof by hinges 34. The material employed in this instance may be plastic, rubber or a metal, such as aluminum. The edges 35 and 36 opposite the hinged edges of the girp are provided with complementing recesses 37 and 38, respectively. The recesses in this embodiment are provided with mating ridges 39 and depressions 40 which permit the snap connection of sections 32 and 33 to each other.

In installation, the hinged hand grip 31 is applied over the reel seat portion of a rod in a manner similar to that of the unhinged hand grip 14. After aligning the recesses 19 and 21 and the central portion 20 formed on the inner surface of the hinged grip with the corresponding projecting surfaces of the rod, the sections 32 and 33 are closed producing the snap engagement of edges 35 and 36 with the resultant rigid securement of the hand grip to the rod.

Figure 6:
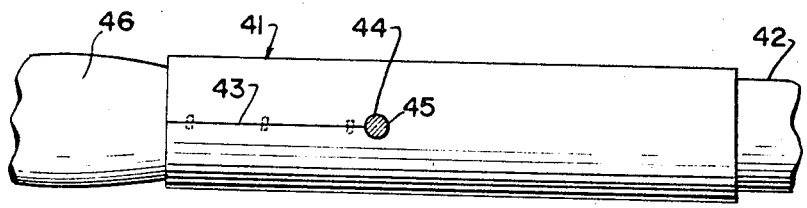
FIG. 6 is a bottom view of an embodiment of the hand grip sleeve of the invention wherein only a portion of the sleeve is cut to facilitate assembly.

FIG. 6 illustrates a resilient gripping sleeve, generally designated 41, of a modified form. As can be seen from FIG. 6, installation of the sleeve 41 over the reel seat portion of the butt end of the rod is accomplished by sliding or telescoping the sleeve over the forward end 42 of the rod butt. A partial axial split 43 of the generally cylindrical sleeve terminates near the midpoint of the underside of the sleeve in an opening 44. When the sleeve is inserted over the end 42 of the rod, this split 43 and opening 44 are axially aligned with respect to the stem 45 of a spinning reel depending from the reel seat (not shown) of the rod. Gripping sleeve 41 is properly positioned over the reel seat and butt portion of the rod after the projecting reel stem 45 has passed axially through split 43 and is located in and projects through opening 44 of the sleeve as shown in FIG. 6.

The internal construction of sleeve 41 is substantially identical to that of sleeve 14 shown in FIGS. 1 and 2 with the exception of the longitudinal break 24 thereof, which in the FIG. 6 construction extends only from the reel stem opening rearwardly. The means for locking the edges bordering split 43, when required, can be the same as that employed in FIGS. 2 and 3.

While the construction illustrated in FIG. 6 shows split 43 extending from the stem opening 44 rearwardly, it is considered to be within the scope of the invention to extend the split 43 in the opposite direction instead. This construction would be utilized in applications where it would be desired to slide or telescope the sleeve 41 over the end 46 of the butt section of the rod instead of over the end 42.

Figure 7:
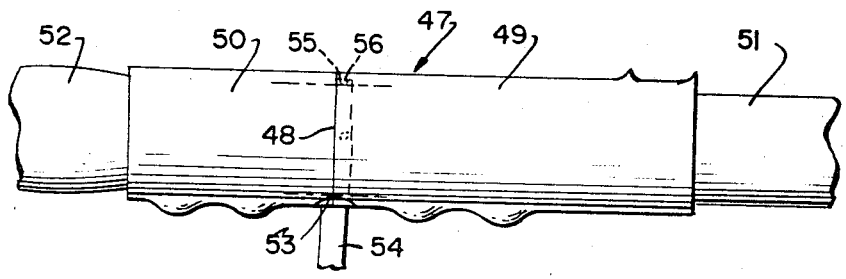
FIG. 7 is a side elevation of an embodiment of the invention illustrating a pair of sleeve sections joined on a line defined generally by the reel stem.

A modified version of the gripping sleeve of the invention is shown in FIG. 7. This sleeve, generally designated 47, embodies, for the most part, the essential internal and external features of the gripping sleeve 14 of FIGS. 1 and 2. The point of departure from the features of sleeve 14 in this modified version lies in the omission of the axial or longitudinal break 24 of the sleeve 14 for its installation over a reel seat and the substitution of a radial split 48 which produces two separate sleeve elements 49 and 50. As is shown in FIG. 7, the forward element 49 is installed on the rod by sliding or telescoping it over the front end 51 of butt portion of the rod. On the other hand, rear element 50 is installed by sliding it over the rear end 52 of the rod. When the elements 49 and 50 have been properly aligned on the butt portion of the rod, an aperture 53 is provided between the elements on the underside of the sleeve through which a reel stem 54 projects. The edges of sleeve elements 49 and 50 bordering split 48, when they have been properly positioned, are located in abutting relationship.

The abutting elements 49 and 50 as illustrated in FIG. 7, are locked together in a manner similar to that shown in FIG. 3. In this instance, resilient projections 55 on the edge of element 49 are inserted into complementary aligned apertures 56 on the abutting edge of element 50. These interlocking projections 55 and apertures 56 serve to hold gripping elements 49 and 50 while the rod is in use. A modified version of the locking arrangement shown in FIG. 5 and others which readily suggest themselves are considered to be within the purview of the invention.

In use, the hand grip of the invention provides a firm, readily controllable and comfortable means for gripping a fishing rod and one which can be effectively used when it is desired to employ more than one rod or reel during a fishing trip.

I claim:

1. A hand grip for a fishing rod and reel combination including a rod and a reel, the rod being provided with a reel seat portion having axially spaced mounting means disposed in engagement with the base portion of the reel and rigidly securing the reel to the rod, one of the mounting means being provided with a rotatable member for adjusting and tightening the means to secure the reel to the rod, a sleeve adapted to be removably telescoped over the normal hand gripping portion of said rod, the sleeve having a series of alternate ridges and depressions covering a portion of the sleeve surface and extending in a direction generally transverse to the longitudinal axis of the sleeve the sleeve being positioned around the reel seat portion of the rod and in engagement with the reel mounting means of the rod and in position maintaining relation with the rotatable adjusting means, the sleeve being provided with an opening of the size sufficient to accommodate the base mounting portion of the reel on the rod, and the sleeve being provided with means for detachably securing the sleeve to the rod and reel.

2. The hand grip of claim 1 for a fishing rod and reel combination wherein the sleeve is relatively elongated and is formed with a discontinuity extending along an axis thereof, portions of the sleeve being separable by separating the edges bordering the discontinuity whereby the sleeve may be opened at the discontinuity and slipped over or off of the handgripping and reel supporting portion of the rod, at least a portion of the discontinuity being enlarged to provide an opening through which the base portion of a reel supported on the rod can project when the sleeve is disposed in surrounding relationship with the hand gripping and reel supporting portion of the rod, and wherein the depressions on the sleeve surface are of a dimension sufficient to cradle an average finger and to provide a positive but comfortable means for gripping the rod and reel combination.

3. The hand grip of claim 2 wherein means are provided for separably connecting the surfaces of the sleeve bordering the discontinuity after the sleeve has been connected to the rod and reel combination whereby the sleeve firmly grips the handgripping and reel supporting portion of a rod.

4. The hand grip of claim 3 wherein the means for removably connecting the sleeve surfaces bordering the discontinuity are on the bordering sleeve surfaces.

5. The hand grip of claim 2 wherein a raised thumb rest is provided opposite the series of alternate ridges and depressions to provide opposed thumb and finger grips for the fishing rod and reel hand grip.

6. The hand grip of claim 2 wherein roughened means are provided on the inner surface of the hand grip to engage and maintain the position of a radial mounting means when the hand grip is mounted upon a rod and reel combination.

7. The hand grip of claim 2 wherein the discontinuity thereof extends axially from one end of the sleeve to the other.

8. The hand grip of claim 2 wherein the discontinuity thereof extends from the enlarged opening through which a reel base portion may project axially to an end of the sleeve to permit insertion of the sleeve over the normal hand gripping portion of a rod from an end of the rod.

9. The hand grip of claim 2 wherein the discontinuity extends generally around the radial axis thereof producing a sleeve having a pair of axially separable sections which can be installed on the hand gripping portion of the rod by insertion over the ends of the gripping portion.

10. The hand grip of claim 1 for a fishing rod and reel combination wherein the sleeve is relatively elongated and is formed in two axially elongated sections, hinge means are provided pivotally connecting the sections, locking means are provided on the sleeve for detachably securing the sections together after the sleeve is mounted on a fishing rod and reel combination, the sleeve is provided with an opening of a size sufficient to accommodate the mounting portion of the reel on the rod whereby the hinged sections may be spread apart, placed over a rod and reel combination and the sections may be locked together around the rod and reel combination in a manner such that the gripping portion of the rod and the reel seat portion of a rod are encased in the sleeve.

11. The hand grip of claim 10 wherein interengageable locking means are provided on each of the two axial elongated sections whereupon the closure of the hinged sections results in a rigid but separable connection of the sections.

12. The hand grip of claim 10 wherein the inner surfaces of the two axial elongated sections are roughened in an area adjacent the reel locking nut of a fishing rod when in position.

References Cited

UNITED STATES PATENTS

| | | | |
|---|---|---|---|
| 1,295,608 | 2/1919 | Schoen. | |
| 1,942,922 | 1/1934 | Gerow | 273—165 |
| 1,965,796 | 7/1934 | Dunkelberger | 43—22 X |
| 2,628,100 | 2/1953 | Beebe | 273—81.4 |
| 2,704,688 | 3/1955 | Park | 273—81 |
| 2,826,852 | 3/1958 | Wardrip | 43—22 |
| 2,984,486 | 5/1961 | Jones | 273—81.2 X |
| 3,095,198 | 6/1963 | Gasche | 273—165 |
| 3,227,455 | 1/1966 | Hulsman | 273—165 |
| 3,295,244 | 1/1967 | Kuntze | 43—22 |

FOREIGN PATENTS 77,749   7/1949   Czechoslovakia.

SAMUEL KOREN, *Primary Examiner.*

D. J. LEACH, *Assistant Examiner.*